INVENTORS
CHARLES L. WILLARD
CHARLES V. O'HARA
ARTHUR F. NEEL
BY
Naylor & Neal
ATTORNEYS United States Patent Office 3,312,453
Patented Apr. 4, 1967

3,312,453
SPRING HANDLING APPARATUS
Charles L. Willard and Charles V. O'Hara, San Mateo, and Arthur F. Neel, La Mirada, Calif., assignors to Connor Spring Manufacturing Company, San Francisco, Calif., a corporation of California
Filed Mar. 30, 1964, Ser. No. 355,786
3 Claims. (Cl. 263—7)

This invention relates to spring handling apparatus and more particularly to apparatus for the automatic handling of helical springs between a spring coiling machine and an automatic assembly machine in which the springs are used.

Many problems are encountered in the handling of helical springs due to the inherent tendency of the springs to become tangled, and these problems are most troublesome when the springs are loosely coiled (that is, where the springs have a large helix pitch) and where the springs must be supplied to automatic assembly equipment where the springs are combined with other components. These problems have been encountered in many spring handling steps where attempts have been made to handle the springs in bulk, since very little vibration or rough handling will cause loosely coiled springs to become hopelessly tangled.

It is a principal object of this invention to provide spring handling apparatus with which loosely coiled helical springs can be kept completely separate from each other while they are processed and transported from a spring coiling machine to a point of ultimate use.

It is another object of the invention to provide economical means by which large helical springs can be shipped in large numbers while the springs are separately packaged.

It is another object of the invention to provide such economical packaging means which will not only keep the springs untangled during shipment but which will also provide efficient means for dispensing the springs individually and very rapidly at their point of ultimate use.

It is another object of the invention to provide apparatus for packaging helical springs in a pocketed web of inexpensive thermoplastic material and to provide in conjunction with such apparatus efficient means for loading the springs into the web from a spring coiling machine and unloading the springs from the web into automatic spring using equipment.

It is another object of the invention to provide such apparatus in which helical springs are packaged in an inexpensive thermoplastic web where the springs are also heat treated before introduction into the web while thermal damage to the web is prevented.

It is another object of the invention to provide spring dispensing apparatus which may be mounted as a supply source for automatic assembly equipment and with which helical springs may be delivered individually from the pocketed web upon demand of the assembly equipment for a spring.

Other objects and advantages of the invention will become apparent from the following description read in conjunction with the attached drawings in which:

FIG. 4 is a horizontal sectional view through the heat treating furnace in the apparatus of FIGS. 1 and 2 taken along the plane indicated at 4—4 in FIG. 2;

FIG. 7 is a schematic diagram of pneumatic control means employed in the apparatus of FIG. 6;

Figure 1:
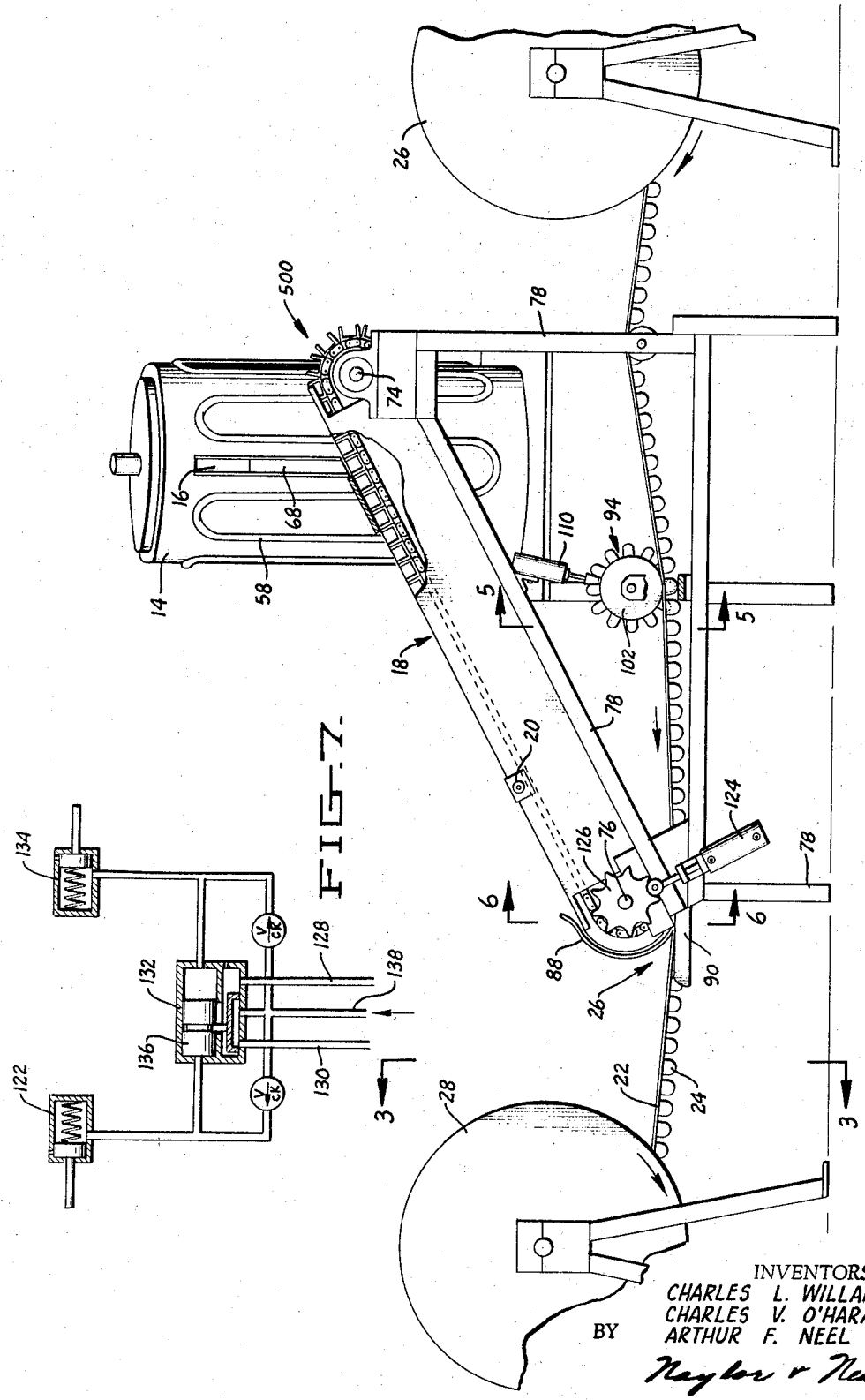
FIG. 1 is a view in side elevation of spring handling apparatus constructed in accordance with this invention and with which springs may be received from a spring coiling machine, processed, and packed in a pocketed web.
Figure 2:
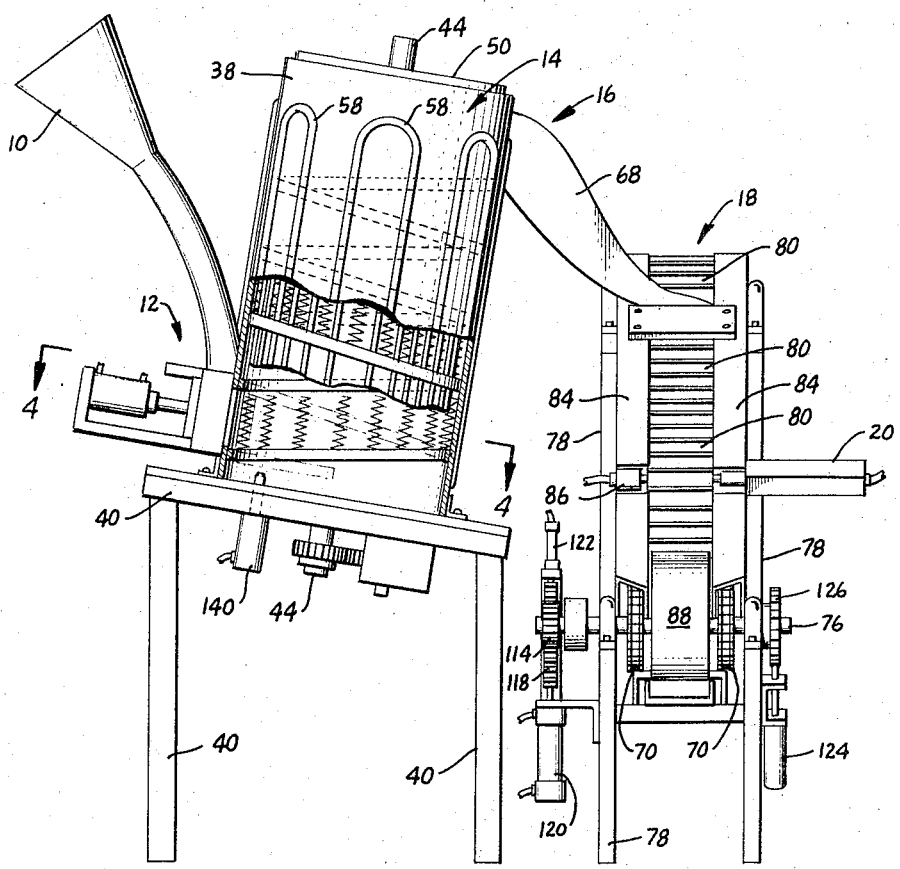
FIG. 2 is a view of the apparatus of FIG. 1 taken in end elevation, viewed from the left of FIG. 1 with parts of the apparatus broken away.

Referring now in detail to the drawings and particularly to FIGS. 1 and 2, helical springs are received at a hopper 10 (FIG. 2) from which they move to a receiving station 12 in a furnace 14, hence to a discharge station 16 of the furnace 14 and onto a cooling conveyor 18. The furnace 14 is maintained at a temperature of about 500° F. so that strains in the spring resulting from coiling are relieved, and the springs are deposited on the cooling conveyor at a temperature of about 500°.

The springs are moved downwardly along the cooling conveyor 18 while they cool to the extent that their temperature is about 150° F. when they reach the lower end of the conveyor. During their travel down the conveyor, a pneumatically actuated plunger 20 sequentially compresses each spring to give the springs substantially uniform lengths with the plunger 20 compressing each spring to a condition in which it is approximately "solid" with its adjacent helical turns contacting each other.

A polyethylene web 22 having a series of pockets 24 is drawn past the lower end of the cooling conveyor 18 from a supply spool 26 to a take-up spool 28. The helical springs in the pockets of the cooling conveyor 18 are transferred to the pockets 24 of the plastic web 22 by transfer means at the lower end 26 of the cooling conveyor, and transport means are provided for synchronizing the movement of the pocketed web 22 will the cooling conveyor 18 for providing an empty pocket 24 of the web 22 at the lower end of the cooling conveyor when each helical spring is delivered therefrom.

Figure 8:
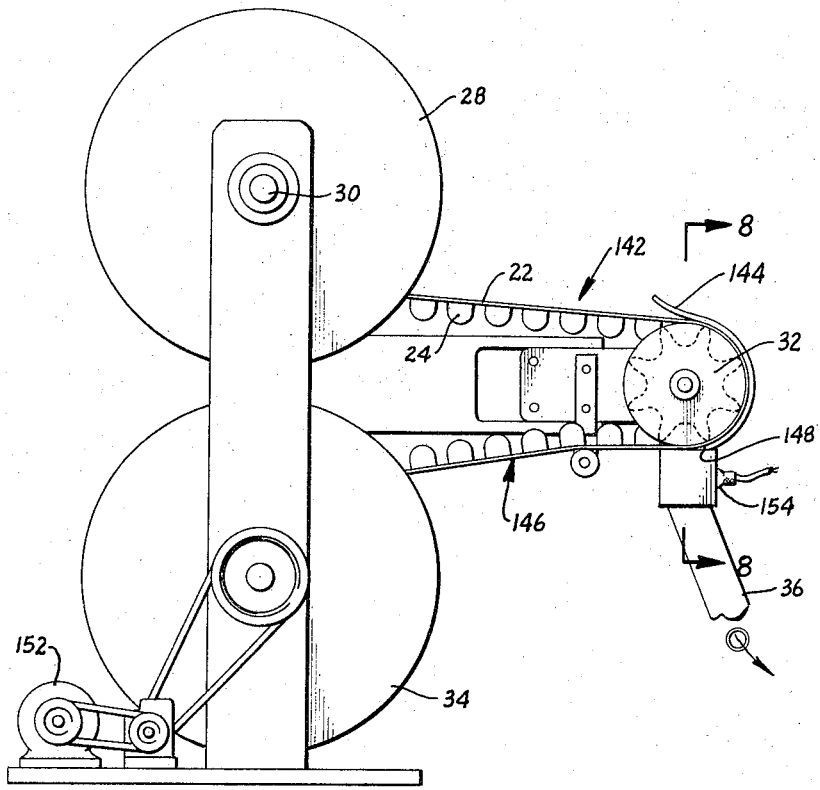
FIG. 8 is a side elevational view of the dispensing apparatus of this invention by which springs are individually dispensed from the pocketed web.
Figure 9:
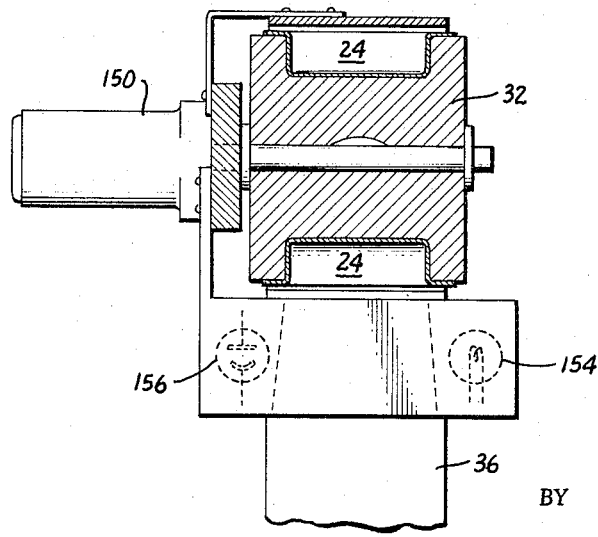
FIG. 9 is a sectional view through the apparatus of FIG. 8 taken along the plane indicated at 9—9 in FIG. 8.

When a full pocketed tape 22 is coiled onto the take-up spool 28, the spool 28 is transferred to the spring dispensing apparatus illustrated in FIGS. 8 and 9, and this transfer may be accomplished by shipment to a remote plant where the dispensing apparatus is used by a customer of the spring manufacturer.

In the dispensing apparatus, the loaded spool 28 is mounted on an axle 30, and the loaded tape 22 is threaded from the spool 28 over a sprocket 32 and onto a take-up spoon 34 so that the tape 22 is inverted as it goes around the sprocket 32 and drops the springs it carries into a discharge chute 36 which extends to suitable automatic assembly machinery in which the spring is assembled with other components.

*The furnace*

With reference to FIGS. 1, 2 and 4, the furnace 14 has an outer stationary shell 38 mounted on a frame 40 and tipped at an angle so that the receiving station 12 is on the uphill side of the frame 38, and the discharge station 16 faces downwardly. An inner cylindrical shell 42 is mounted inside the outer shell 38 coaxially therewith and supported on the frame 40 by a central drive shaft 44 and thrust bearing (not shown). The lower end of the inner shell 42 is provided with a closure plate 46 (FIG. 4) which is provided with a circumferentially spaced series of indexing apertures 48 the purpose of which is indicated below. A removable top 50 is provided on the shaft 44 to permit access to the interior of the furnace for replacement of heating elements and removal of any springs which may become tangled in the furnace.

As indicated in FIG. 4, an annular heating chamber 52 is provided between the inner and outer shells 42 and 38, and the chamber 52 is divided into a helical series of spring receiving pockets by means of a helical scroll 54 on the inner side of the outer shell 38 and a series of vertcal bars 56 mounted on the outer surface of the inner shell 42. The annual heating chamber 52 is heated by means of Calrod heating elements 58 and 60 which are secured to the outer and inner shells 38 and 42 respectively.

As indicated in FIGS. 2 and 4, an opening 62 is provided in the outer shell adjacent to the bottom thereof at the receiving station 12, and communicates with the lower end of the spring receiving chute 10 in which springs are delivered from the spring coiling machine. Since the opening 62 faces upwardly as indicated in FIG. 2, the springs which slide down the chute 10 generally move completely into the chamber 52 and rests upon the scroll 54 between a pair of the vertical bars 56. In order to be sure that each spring is completely received within a pocket in the chamber 52 before the pocket is moved, a small pneumatic ram 64 is mounted adjacent to the receiving station 12 and operates a plunger 66 which is moved inwardly to the periphery of the chamber 52 after each spring is deposited in the chute 10 and before the inner shell 42 is rotated. In this way, springs are sequentially deposited in the lowest pocket in the helical series of pockets in the furnace, and as explained hereinafter, the drive shaft 44 is rotated sequentially to move the pockets with springs contained therein from the receiving station 12 along the helical scroll 54 to the delivery station 16.

At the delivery station 16, an opening is cut into the outer shell 38 so that the springs fall out of the furnace pockets as they reach the top of the scroll 54 adjacent to the discharge station. A metal chute 68 leads from the upper opening in the shell 38 at the furnace discharge station to the top of the cooling conveyor 18 to convey the springs from the furnace to the cooling conveyor.

*The cooling conveyor*

Figure 6:
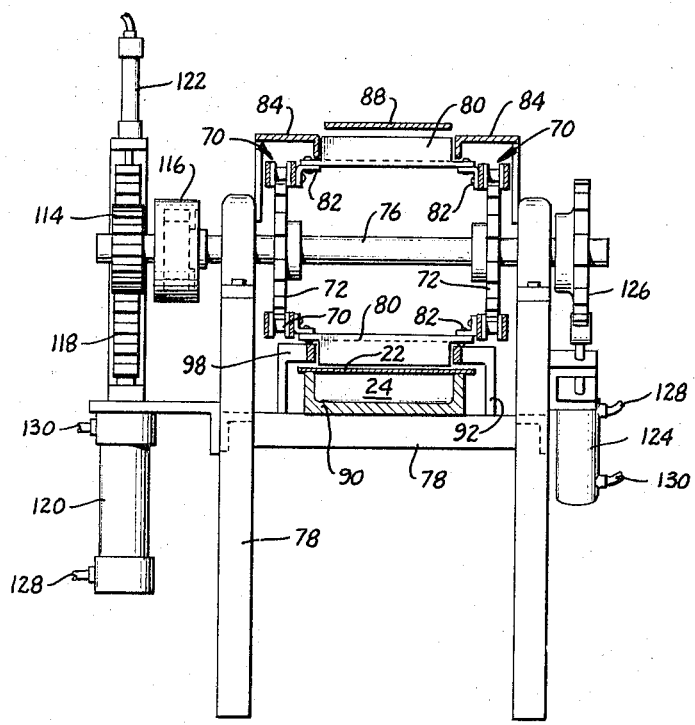
FIG. 6 is an enlarged view of the discharge end of the cooling conveyor in the apparatus of FIG. 1 taken along the plane indicated at 6—6 in FIG. 1.

With reference to FIGS. 1, 2 and 6, the cooling conveyor 18 is formed on a pair of roller chains 70 which are entrained over sprockets 72 on shafts 74 and 76 journaled at the upper and lower ends of a frame 78. As indicated in FIG. 6, the cooling conveyor is formed of a plurality of U-shaped channel members 80 attached by brackets 82 to the chains 70 with the channel members 80 postioned between a pair of angle plates 84 which are mounted on the frame members 78. In this way, the channel members 80 define pockets on the upper course of the cooling conveyor 18, and the ends of the pockets are closed by the angle plates 84.

As mentioned above, the spring compressing ram 20 is mounted on the cooling conveyor 18, and it is positioned opposite to an opening in one of the angle plates 84 permitting the ram to enter the pockets longitudinally through the channel members 80. The plunger 20 may be operated by any suitable means, and here it is operated by a pneumatic ram, the retraction of which is controlled by a poppet valve 86.

A metal scroll 88 is mounted at the lower end of the cooling conveyor 18 covering the area of the conveyor where the conveyor pockets invert from an upwardly facing to a downwardly facing condition so that the scroll 88 prevents the springs from falling out of the pockets in the cooling conveyor until the pockets reach a predetermined position at the end of the scroll 88.

As indicated in FIG. 6, a guide channel 90 is mounted on one of the frame members 78 immediately below the lower end of the cooling conveyor and guides the pocketed web 22 past the lower end of the cooling conveyor. In this regard, the sectional view of FIG. 6 is taken along the plane at which the lower portion of the scroll 88 ends, and at this position, springs are transferred from the cooling conveyor to the pocketed tape as they drop off of the scroll 88. It should be noted that while the apparatus can be constructed to move the cooling conveyor and pocketed tape in the same direction at the point of closest approach in FIG. 6, this apparatus has been constructed with the cooling conveyor and tape moving in opposite directions in this area, and spacer supports 92 are provided in this area for supporting the lower reach of the cooling conveyor to keep the ends of the cooling conveyor pockets closed in this area while also supporting the cooling conveyor so that it does not sag and interfere with motion of the pocketed tape.

Figure 3:
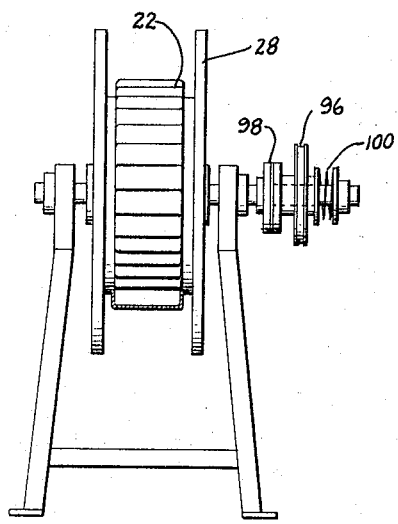
FIG. 3 is an elevational view of the pocketed web takeup reel in the apparatus of FIG. 1 taken along the plane and in the direction indicated at 3—3 in FIG. 1.

As indicated hereinafter, while the apparatus may be operated on a continuous motion basis, it is often desirable that instead it be operated on a continual start-stop basis so that it is easily keyed to the output of a spring coiling machine. With the apparatus operating on a start-stop basis and with the cooling conveyor and pocketed tape moving in opposite directions at the point of spring transfer, independent drive mechanisms are employed for both the cooling conveyor and the pocketed tape, though of course, a single drive mechanism may be employed. In this regard, a pocket synchronizing mechanism 94 described in detail hereinafter is mounted on the frame 78 to synchronize the motion of pockets of the tape 22 with respect to the discharge of springs from the cooling conveyor, and the stretch of pocketed tape 22 between the pocket finder 94 and take-up spool 28 is maintained under tension by means of suitable drive connections not shown connected to a sprocket 96 (FIG. 3) on the take-up spool 28 with the sprocket 96 connected to rotate the spool 28 continuously through an overriding friction clutch 98 held in engagement by spring 100. In this way, the loaded portion of the tape 22 is mantained under tension and prevented from bouncing by the start-stop operation of the equipment so that springs in the pocketed tape are not bounced out of the tape. Where this latter problem is encountered, it may also be solved simply by laying a short strip of Masonite or the like on the tape 22 between the transfer station 26 and the take-up spool 28.

*The pocketed web transport*

Figure 5:
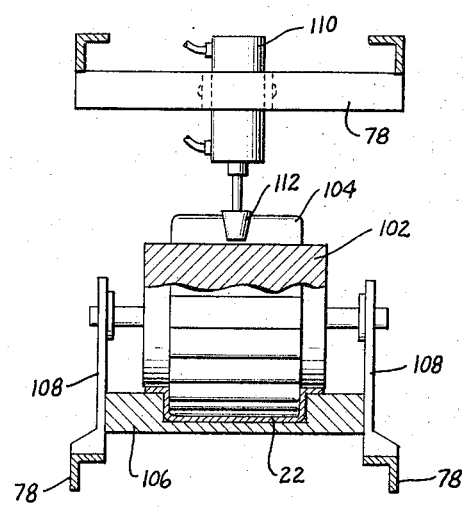
FIG. 5 is a detailed view on an enlarged scale of the apparatus of FIG. 1 taken along the plane indicated at 5—5 in FIG. 1.

As indicated above, the length of pocketed web 22 between the pocket finder 94 and take-up spool 28 is maintained under tension by the continuous drive of the take-up spool 28 through an overriding clutch. With reference to FIG. 5, the pocket finder 94 includes a rotary lobed wheel 102 the lobes 104 of which are positioned to enter the pockets 24 of the web 22 while the web passes between the wheel 102 and a guide channel 106. The wheel 102 and guide channel 106 are mounted on brackets 108 which are attached to the frame member 78. A pneumatic holding ram 110 is mounted above the wheel 102 on a frame member 78 and carries a locking plunger 112 which engages the periphery of the lobed wheel 102 between the lobes 104 to position the pocket finder 94 in a proper position so that a pocket 24 of the web 22 is positioned in spring receiving relation at the lower edge of the scroll 88.

*Drive mechanism*

As indicated above, a wide variety of drive mechanisms may be employed for co-ordinating the operation of a furnace, cooling conveyor, and web transport with the output of a spring coiling machine. As the apparatus is illustrated, however, a pneumatic actuated system is employed where a plurality of poppet valves function in well known manner to sequentially index the movements of the furnace, cooling conveyor, and pocket finder in synchronization with each other. The three indexing mechanisms employed for these components are substantially the same, and only the mechanism for indexing the cooling conveyor is shown and described in detail.

Thus, with reference to FIGS. 6 and 7, the sprocket shaft 76 is indexed by a pinion gear 114 through a friction clutch 116, and indexing movement is imparted to the gear 114 by a moving rack 118 connected to a pneumatic ram 120 and positioned to engage a relief valve 122 when the rack 118 reaches the limit of its indexing motion.

The friction clutch 116 is provided in the drive train for the sprockets to permit the shaft 76 to be centered in an indexing position by a pneumatic locking plunger 124 which engages a lobed wheel 126 on the axle 76. The fluid conduits 128 and 130 of the pneumatic rams 120 and 124 are connected to the output conduits of a poppet valve 132 (FIG. 7) as indicated so that when the ram 120 withdraws the indexing rack 118, pressure being applied to conduit 130 of the ram 120, the locking plunger 124 engages the lobed wheel 126, pressure being applied to the conduit 130 of the pneumatic cylinder of the plunger 124, so that the overriding friction clutch 116 yields on the return stroke of the rack 118 to prepare the rack and its pinion for the next indexing cycle.

The poppet valve 132 is controlled by the relief valve 122 and a similar relief valve 134 which may be installed adjacent to a timing cam on the main drive shaft of a spring coiling machine. The relief valve 134 and its operating cam are rotatively positioned on the drive shaft of the spring coiling machine to provide indexing of the cooling conveyor at a predetermined time in the coiling cycle of the coiling machine.

Thus, as indicated in FIG. 7, the relief valve 134 is positioned to be operated to vent the right hand side of the poppet valve 132 when indexing of the cooling conveyor is to be effected. When the relief valve 134 is momentarily depressed, the central plunger 136 of the poppet valves moves to its right hand position to connect an air pressure supply conduit 138 to the conduits 128 to withdraw the locking plunger 124 and expand the ram 120. As the ram 120 expands and the rack 118 advances, the cooling conveyor is advanced by the width of one pocket until the rack 118 engages the relief valve 122. When the relief valve 122 is engaged to vent the left hand side of the poppet valve 132, the poppet valve plunger indexes back to its illustrated position to connect the air supply conduit 138 to conduits 130 by which the locking plunger 124 is again extended to lock the cooling conveyor in an indexed position, and the rack 118 is withdrawn for the next indexing operation.

It will be noted that with the provision of the overriding clutch 116 and the locking plunger 124, the cooling conveyor 18 is accurately locked in each succeeding index position, and the pocket finder 94 is similarly locked by its locking plunger 110. As indicated in FIG. 2, a similar pneumatic locking plunger 140 is mounted on the frame 40 for engaging the circumferentially spaced indexing holes 48 in the bottom plate 46 of the furnace 14. In this way, the position of the pocketed tape 22 and the position of the furnace pockets are accurately synchronized with operation of a spring coiling machine; the advancing motions of the pocket finder and furnace pockets are provided by mechanisms similar in function to the rack and pinion 118 and 114, but these mechanisms are not illustrated in detail. The three indexing mechanisms may be controlled by three separate relief valves similar to the relief valve 134 operated by cams on the main shaft of the spring coiling machine but it has been desirable to provide only two relief valves 134 on the spring coiling machine where one relief valve controls operation of the furnace indexing mechanism and the other relief valve controls operation of both the cooling conveyor and the transport mechanism for the pocketed tape 22. Thus, it is frequently desirable when starting off operation of the spring packaging mechanism to disconnect the control mechanism for the cooling conveyor and pocketed tape while springs are delivered from the coiling machine to fill the furnace 14 without advancing empty pockets of the pocketed web 22 onto the take-up spool 28. Similarly, it may be desirable in some instances to discontinue operation of the furnace 14 for servicing and the like while operation of the cooling conveyor 18 is continued to package the remaining springs which are accumulated on the cooling conveyor.

*The dispensing mechanism*

As indicated above, the spring packaging mechanism of FIG. 1 is particularly designed for use in packaging helical springs in spirally wound pocketed tapes, and in this regard, a substantial saving in the cost of the packaging materials is obtained where the tape is wound as illustrated in FIG. 1 with the pockets 24 of the tape facing radially inwardly on the take-up spool 28. In this way, the pockets on each spiral turn of the web 22 are closed by the next adjacent interior spiral turn of the web, and the springs are efficiently held within the spirally wound web and do not fall from the wound web as they would if the pockets of the web faced outwardly. This arrangement of the spirally wound pocketed webs is employed in the dispensing apparatus of FIG. 8 where the pocketed web 22 is unwound from the bottom of the loaded spool 28 onto a horizontal upwardly facing path 142 where the springs are supported in the tape 22 solely by gravity. A shroud 144 is provided encircling the sprockets 32 so that the pockets of the tape 22 are closed as the tape extends around the sprocket to a downwardly facing path 146 to a motor driven take-up spool 34. As the pockets of the tape 22 pass the lower edge 148 of the shroud 144, the springs drop out of the pockets 24 into the discharge chute 36. As indicated in FIG. 9, the axle of the sprocket 32 is provided with an overriding friction clutch 150 restraining motion of the tape pockets past the lower edge 148 of the shroud 144, and the motor driven take-up spool 34 is operated by an electric motor 152 and control means including a light 154 and photocell 156 (FIG. 9) together with a differential relay (not shown) connected to both the photocell and the conventional demand signal means on an automatic assembly machine. Thus, when an automatic assembly machine adjacent to the chute 36 delivers a demand signal indicating the need of a spring, the differential relay is indexed to turn the motor 152 on to draw the tape 22 onto the take-up spool 34. As soon as a spring containing pocket of the tape 22 passes the lower edge 148 of the shroud 144, the spring drops out of the pocket and falls down the chute 36 past the photocell 156, and when the photocell 156 senses the presence of a spring in the chute 36, it reverses the differential relay to turn off the motor 152 until another spring is demanded by the assembly machine.

While certain specific embodiments of this invention have been illustrated and described in detail herein, it is obvious that many modifications thereof may be made without departing from the spirit and scope of the invention.

We claim:
1. Spring handling apparatus for handling springs delivered from a spring coiling machine which comprises:
 (a) a furnace;
 (b) a pocket conveyor in said furnace for conveying springs separately through said furnace with said conveyor having;
  (1) a receiving station for receiving individual springs from a spring coiling machine,
  (2) a delivery station for delivering springs from said furnace,
  (3) a series of spring receiving pockets moveable sequentially from said receiving station to said delivery station, and
  (4) advancing means for moving said pockets away from said receiving station;

(c) a cooling conveyor mounted outside of said furnace for receiving springs from said delivery station with said cooling conveyor having a series of pockets moveable sequentially away from said delivery station;
(d) a pocketed web;
(e) transport means for moving said pocketed web past said cooling conveyor and coiling said web after it is moved past said cooling conveyor, and;
(f) transfer means for moving said cooling conveyor and said transport means in synchronization with each other in transferring springs from said cooling conveyor to said web;
(g) said series of pockets of said cooling conveyor being arranged in a closed loop having upper and lower reaches with said upper reach positioned to receive springs from said delivery station at one end and convey the springs across said upper reach with axes of the springs positioned transversely of said upper reach, and a plunger mounted adjacent to said upper reach for reciprocal movement into and out of the pockets of said cooling conveyor for sequentially engaging the springs therein in a direction axially of the spring.

2. Spring handling apparatus for handling springs delivered from a spring coiling machine which comprises:
(a) a furnace;
(b) a pocket conveyor in said furnace for conveying springs separately through said furnace with said conveyor having;
   (1) a receiving station for receiving individual springs from a spring coiling machine,
   (2) a delivery station for delivering springs from said furnace,
   (3) a series of spring receiving pockets moveable sequentially from said receiving station to said delivery station, and
   (4) advancing means for moving said pockets away from said receiving station;
(c) a cooling conveyor mounted outside of said furnace for receiving springs from said delivery station with said cooling conveyor having a series of pockets moveable sequentially away from said delivery station;
(d) a pocketed web;
(e) transport means for moving said pocketed web past said cooling conveyor and coiling said web after it is moved past said cooling conveyor, and;
(f) transfer means for moving said cooling conveyor and said transport means in synchronization with each other in transferring springs from said cooling conveyor to said web;
(g) said furnace comprises:
   (1) inner and outer cylindrical shells defining an annular chamber between them,
   (2) heating means adjacent to said shells for heating said annular chamber,
   (3) a helical scroll in said chamber attached to one of said shells,
   (4) a plurality of longitudinal ribs on the other one of said shells projecting into said chamber with said ribs and scroll dividing said chamber into said series of pockets, and
   (5) drive means for rotating said shells with respect to each other with said receiving and delivery stations located at opposite ends of said scroll.

3. A furnace for treating coil springs to relieve stresses therein, said furnace comprising:
(A) inner and outer generally cylindrical shell members defining an annular chamber between them,
(B) heating means for heating said annular chamber,
(C) a helical scroll in said chamber attached to one of said members,
(D) a plurality of longitudinal ribs on the other of said shells projecting into said chamber with said ribs and scroll dividing said chamber into a helical series of pockets,
(E) a spring receiving opening extending into said chamber adjacent to one end of said scroll for introducing coil springs into said pockets,
(F) a spring discharge opening extending from said chamber adjacent to the other end of said scroll for discharging springs from said pockets,
(G) drive means for rotating said shells with respect to each other to cause said pockets to move from said receiving opening to said discharge opening, and;
(H) mounting means attached to said shells supporting said shells in a position with their cylindrical axes inclined to a vertical plane with said receiving opening positioned in the upper side of said outer shell member and with said discharge opening positioned in the lower side of said outer shell whereby springs may be fed to and from said furnace by gravity.

References Cited by the Examiner
UNITED STATES PATENTS

| | | | |
|---|---|---|---|
| 1,921,956 | 8/1933 | Vickers | 263—6 |
| 2,013,905 | 9/1935 | Adams | 263—7 |
| 2,372,072 | 3/1945 | Flaws | 206—56 |
| 2,927,782 | 3/1960 | Paton et al. | 263—7 |
| 3,009,689 | 11/1961 | Hinz | 263—7 |

FOREIGN PATENTS 329,723  5/1930  Great Britain.

FREDERICK L. MATTESON, JR., *Primary Examiner.*

D. A. TAMBURRO, *Assistant Examiner.*